US010169574B2

(12) United States Patent
Nesher et al.

(10) Patent No.: US 10,169,574 B2
(45) Date of Patent: *Jan. 1, 2019

(54) USING TRUSTED EXECUTION ENVIRONMENTS FOR SECURITY OF CODE AND DATA

(71) Applicant: Intel Corporation, Santa Clara, CA (US)

(72) Inventors: Nadav Nesher, Shmishit (IL); Alex Berenzon, Zikhron Ya'akov (IL); Baruch Chaikin, D.N. Misagv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,551

(22) Filed: Feb. 28, 2018

(65) Prior Publication Data

US 2018/0189482 A1 Jul. 5, 2018

Related U.S. Application Data

(63) Continuation of application No. 14/572,060, filed on Dec. 16, 2014, now Pat. No. 9,940,456.

(51) Int. Cl.
*H04L 9/00* (2006.01)
*G06F 21/00* (2013.01)
(Continued)

(52) U.S. Cl.
CPC ............ *G06F 21/53* (2013.01); *G06F 21/57* (2013.01); *G06F 21/71* (2013.01); *H04L 2209/127* (2013.01)

(58) Field of Classification Search
None
See application file for complete search history.

(56) References Cited

U.S. PATENT DOCUMENTS 8,832,452 B2 9/2014 Johnson
9,246,690 B1 * 1/2016 Roth ................. H04L 9/3268
(Continued)

FOREIGN PATENT DOCUMENTS

WO 2011/078855 6/2011
WO 2014/196966 12/2014

OTHER PUBLICATIONS

International Searching Authority, "Notification of Transmittal of the International Search Report and the Written Opinion of the International Searching Authority," dated Aug. 9, 2016 in International application No. PCT/US2015/060879.
(Continued)

*Primary Examiner* — Alexander Lagor
(74) *Attorney, Agent, or Firm* — Trop, Pruner & Hu, P.C.

(57) ABSTRACT

An embodiment includes a processor coupled to memory to perform operations comprising: creating a first trusted execution environment (TXE), in protected non-privileged user address space of the memory, which makes a first measurement for at least one of first data and first executable code and which encrypts the first measurement with a persistent first hardware based encryption key while the first measurement is within the first TXE; creating a second TXE, in the non-privileged user address space, which makes a second measurement for at least one of second data and second executable code; creating a third TXE in the non-privileged user address space; creating a first secure communication channel between the first and third TXEs and a second secure communication channel between the second and third TXEs; and communicating the first measurement between the first and third TXEs via the first secure communication channel. Other embodiments are described herein.

20 Claims, 6 Drawing Sheets

(51) Int. Cl.
*G06F 21/60* (2013.01)
*G06F 21/53* (2013.01)
*G06F 21/57* (2013.01)
*G06F 21/71* (2013.01)

(56) References Cited

U.S. PATENT DOCUMENTS

| | | | |
|---|---|---|---|
| 2007/0171921 A1* | 7/2007 | Wookey | G06F 3/1415 370/401 |
| 2012/0331550 A1 | 12/2012 | Raj et al. | |
| 2013/0151846 A1 | 6/2013 | Baumann et al. | |
| 2013/0347064 A1 | 12/2013 | Aissi | |
| 2014/0157404 A1 | 6/2014 | Chhabra et al. | |
| 2014/0189246 A1* | 7/2014 | Xing | G06F 21/53 711/135 |
| 2014/0205099 A1 | 7/2014 | Christodorescu et al. | |
| 2014/0317686 A1* | 10/2014 | Vetillard | G06F 21/74 726/2 |

OTHER PUBLICATIONS

McKeen, Frank, et al., "Innovative Instructions and Software Model for Isolated Execution," Workshop on Hardware and Architectural Support for Security and Privacy, Intel Corporation, 2013.

Anati, Ittai, et al., "Innovative Technology for CPU Based Attestation and Sealing," Workshop on Hardware and Architectural Support for Security and Privacy, Intel Corporation, 2013.

Hollister, Sean "Intel confirms Dual OS computers that run both Windows and Android," The Verge, http://www.theverge.com/2014/1/6/5282502/intel-confirms-dual-os-computers-that-run-both-windows-and-android, Jan. 6, 2014.

Hoekstra, Matthew, "Intel® SGX for Dummies (Intel® SGX Design Objectives)," Intel Developer Zone, https://software.intel.com/en-us/blogs/2013/09/26/protecting-application-secrets-with-intel-sgx, Sep. 26, 2013.

Hardy, Norm, "The Confused Deputy (or why capabilities might have been invented)," http://www.cis.upenn.edu/~KeyKOS/ConfusedDeputy.html, Key Logic, Inc., Mar. 2014.

Gotze, Kevin, "3 papers on new Intel Software Guard Extension (SGX) instructions to create Isolated application environments," trust-HUB.org, Jun. 24, 2013.

Hoekstra, Matthew, et al., "Using Innovative Instructions to Create Trustworthy Software Solutions," Workshop on Hardware and Architectural Support for Security and Privacy, Intel Corporation, 2013.

arm.com, "ARM the Architecture for the Digital World: TrustZone," http://www.arm.com/products/processors/technologies/trustzone/index.php, Dec. 2014.

McAfee, "Endpoint Security Protection, McAfee is a leader in the Gartner Magic Quadrant for Endpoint Protection Platforms" http://www.mcafee.com/au/products/endpoint-protection/index.aspx, Dec. 2014.

United States Patent and Trademark Office, "Patent Application," U.S. Appl. No. 12/590,767, filed Nov. 13, 2009.

European Patent Office, Supplementary European Search Report dated May 7, 2018 in European Patent Application No. 15880627.3.

Asokan et al., "Mobile Trusted Computing," Proceedings of the IEEE, Aug. 2014, pp. 1189-1206, vol. 102, No. 8.

* cited by examiner

USING TRUSTED EXECUTION ENVIRONMENTS FOR SECURITY OF CODE AND DATA

This application is a continuation of U.S. patent application Ser. No. 14/572,060, filed Dec. 16, 2014. The content of the above application is hereby incorporated by reference.

BACKGROUND

Computer systems handle increasing amounts of important, sensitive, and valuable information that needs protection from tampering and theft. There are many software applications that must keep a secret on a platform. Some example applications are financial/banking applications and medical records applications. Each secret holder may be mutually distrustful of other secret holders and each secret may be protected independently of the other secrets.

To counter such tampering and theft, a trusted software execution environment (TXE) may be used. A TXE prevents untrusted software from having access to trusted software and data. Intel® Software Guard Extensions (Intel® SGX) are an example of a TXE and include a set of instructions and memory access changes added to Intel® Architecture. These extensions allow an application to instantiate a protected container, sometimes referred to as an enclave. An enclave is a protected area in the application's address space that provides confidentiality and integrity even in the presence of privileged malware. Attempted accesses to the enclave memory area from software not resident in the enclave are prevented even from privileged software such as virtual machine monitors, BIOS, or operating systems.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

As addressed above, software applications are often exposed to tampering from malware. The malware, if unchecked, attacks code flow and data thereby diminishing data integrity. Many application developers are not aware of the malware risks and/or do not know how to protect their applications from malware threats. Such developers may rely on the operating system (OS) or anti-virus (AV) software to protect applications from malware. However, such methods are limited by to ability of the OS to not be infected and of the AV software to have accurate signatures of the malware.

However, an embodiment uses a TXE (e.g., Intel® SGX) in a novel manner to effectively counter malware. Furthermore, the embodiment does so in a manner that is easy to implement. For instance, many developers are not aware of TXEs and/or do not know how to use TXEs to safeguard their applications. However, the embodiment addresses these issues by, for example, providing one or more libraries the programmer can use to easily link his or her application to a TXE. Embodiments (1) add protection on code execution and ensure data integrity, (2) serve a wide spectrum of software applications, (3) have little impact on application of the developers applications, and (4) are highly configurable.

Specifically, an embodiment uses one or more "trusted agents" that are linked to applications (e.g., 1 trusted agent per application process) and that are coupled to a "trusted manager" (e.g., 1 trusted manager per device). The trusted manager is responsible for controlling the overall behavior for the one or more trusted agents and for managing data for all of the trusted agents. The trusted manager and any trusted agent communicate with each other and with other entities via one or more secure communication channels (within memory of the device that includes the trusted and managing agents or via web with an entity not included in the device). The trusted agent runs in the application process space and collects information (e.g., measurements) corresponding to the application (e.g., critical code and/or data of the application or applications).

The trusted manager and/or trusted agents may be implemented using Intel® SGXs. Measurement(s) (collected by the trusted agent) may be transferred to the trusted manager (via a secure channel) and processed/verified by the trusted manager. In another embodiment the measurement(s) may be securely sent to a "backend service" (e.g., a computing node remote from but coupled to a computing node that includes the trusted agent(s) and trust manager) where the verification of the measurement is performed. Any detection of a "bad" measurement (e.g., code and/or data has been tampered with/modified) may be reported to the user and/or the provider of the application and/or the "backend service" for further processing. Thus, the trusted manager can monitor the measurements of trusted agent(s) on the device and/or a backend service can monitor measurements of the trusted manager.

An embodiment may further counter malware by implementing a "keep alive" mechanism. A "keepalive" signal (or sometimes referred to as a "keep alive" signal) is a signal (e.g., message) sent by one device to another device to check that the communication link between the two device is operating, or to prevent this link from being broken. For example, a keepalive signal may be sent at predefined intervals. After a signal is sent, if no reply is received the link or trusted agent is assumed to be down or compromised (possibly by malware). Keepalive messages tend to be short and not take much bandwidth. However, their precise format and usage terms depend on the communication protocol.

Embodiments possess many advantages. For example, an embodiment may include a TXE that can run critical code in a secure container and that can measure that critical code (or portions thereof). An embodiment may perform ad hoc discovery of tampering, regardless of the nature of the malware (or the signature of the malware). An embodiment has little to no dependency on the integrity of the OS and/or AV updates. An embodiment configures (at different times) different portions of code/data to measure. The "target" portions for measurement are configurable and can be controlled by the owner, application author, and the like. Further, by linking applications (statically or dynamically) to the TXE environments the solution is "generic" and may easily work with various applications. Accordingly, little effort from the application developer is needed to enable the service. Finally, various embodiments use safe keep-alive mechanisms to prevent denial-of-service (DoS) attacks.

A DoS or distributed denial-of-service (DDoS) attack is an attempt to make a machine or network resource unavailable to its intended users. Although the means to carry out a DoS attack vary, such an attack generally consists of efforts to temporarily or indefinitely interrupt or suspend services of a host connected to the Internet. A DoS attack may involve saturating the target machine with external communications requests, so much so that the target machine cannot respond to legitimate traffic or responds so slowly as to be rendered essentially unavailable. Such attacks usually lead to a server overload. In general terms, DoS attacks are implemented by either forcing the targeted computer(s) to reset, or consuming its resources so that it can no longer provide its intended service or obstructing the communication media between the intended users and the victim so that they can no longer communicate adequately. A DoS attack may also include denial to a service inside the device, such as system 100 of FIG. 1 (e.g., denial of software access to a hardware mechanism). For example, such DoS attacks may include denying the proper operation of a trusted agent or trusted manager; and/or denying the operation of a communication channel between the trusted agent and the trusted manager and/or between the trusted manager and the backend service.

Figure 1:
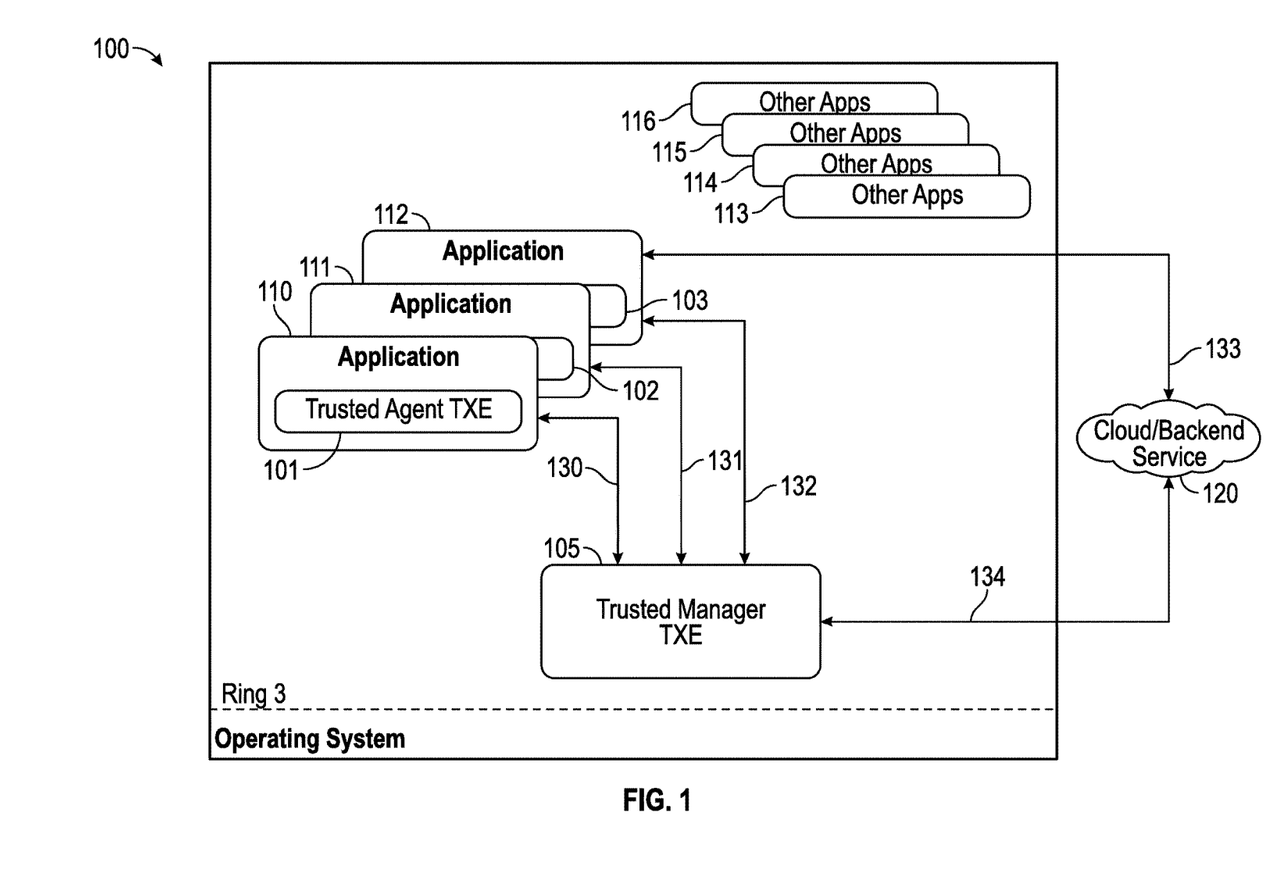
FIG. 1 includes a plurality of TXEs in an embodiment of the invention.

FIG. 1 includes a plurality of TXEs in an embodiment of the invention. Computing node 100 may include Trusted Manager TXE 105, which may couple to Trusted Agent TXEs 101, 102, 103 via secure communication channels 130, 131, 132. Trusted Agent TXEs 101, 102, 103 may correspond to software applications 110, 111, 112. Other software applications 113, 114, 115, 116 may not initiate or correspond to a TXE. Any of the TXEs 101, 102, 103 and/or 105 may couple to a cloud-based backend service remote computing node 120 via secure communication channels 133, 134.

In an embodiment, TXEs 101, 102, 103, 105 are ring 3 services running on device 100. In an embodiment, each of applications 110, 111, 112, 113, 114, 115, 116 may also be running or executing on device 100 (or at least stored in memory resident within device 100). Device 100 may be any of various computing nodes that rely upon trusted execution of software such as, for example, some or all of Smartphones, tablets, notebooks, laptops, Ultrabooks®, server nodes, automobiles, aviation drones, fitness bands worn on the wrist/body to monitor biological data, spectacles that provide internet access, combinations thereof such as a hybrid tablet and Smartphone, and the like.

A ring 3 service refers to hierarchical protection domains, often called protection rings, which are mechanisms to protect data and functionality from faults (e.g., by improving fault tolerance) and malicious behavior. Computer OSs provide different levels of access to resources. A protection ring is one of two or more hierarchical levels or layers of privilege within the architecture of a computer system. This is generally hardware-enforced by some CPU architectures that provide different CPU modes at the hardware or microcode level. Rings are arranged in a hierarchy from most privileged (most trusted, usually numbered zero) to least privileged (least trusted, usually with the highest ring number). On most operating systems, Ring 0 is the level with the most privileges and interacts most directly with the physical hardware such as the CPU and memory. In an embodiment ring 0 is for kernel code and device drivers, ring 2 is for privileged code (e.g., user programs with I/O access permissions), and ring 3 is for unprivileged code (e.g., user programs).

Returning to FIG. 1, the Trusted Manager TXE 105, as well as Trusted Agent TXEs 101, 102, 103, may be implemented using Intel® SGX and the like. TXEs 101, 102, 103, 105 may each include software running inside secure container (TXE). TXEs 101, 102, 103, 105 may provide critical services/functionality to maintain secrets (e.g., encryption keys, cloud service 120 whitelist, measurements verification values, and the like).

Trusted manager TXE 105 may use a white-list that defines the backend service (e.g., service 120) to which any of TXEs 101, 102, 103, 105 should connect to. For example, a whitelist is a list or register of approved entities for providing (or being provided) a particular privilege, service, mobility, access, and/or recognition. Those on the list will be accepted, approved or recognized. Whitelisting is the reverse of blacklisting, the practice of identifying those that are denied, unrecognized, or ostracized.

In an embodiment TXE 105 creates shared memory space (e.g., named memory space) to be later used by any or all of trusted agents 101, 102, 103 as the infrastructure for communication with trusted manger 105. Using the basic properties of a TXE such as Intel® SGX, trusted manager TXE 105 can connect (channel 134) with backend service 120 and attest to the validity and security properties of TXE 105 so that service 120 can achieve a degree of trust with TXE 105. This connection 134 may be used for all services later provided by trusted manager 105 (e.g., supply of measurements from TXEs 101, 102, 103) and all communication/control from backend service 120.

Figure 2:
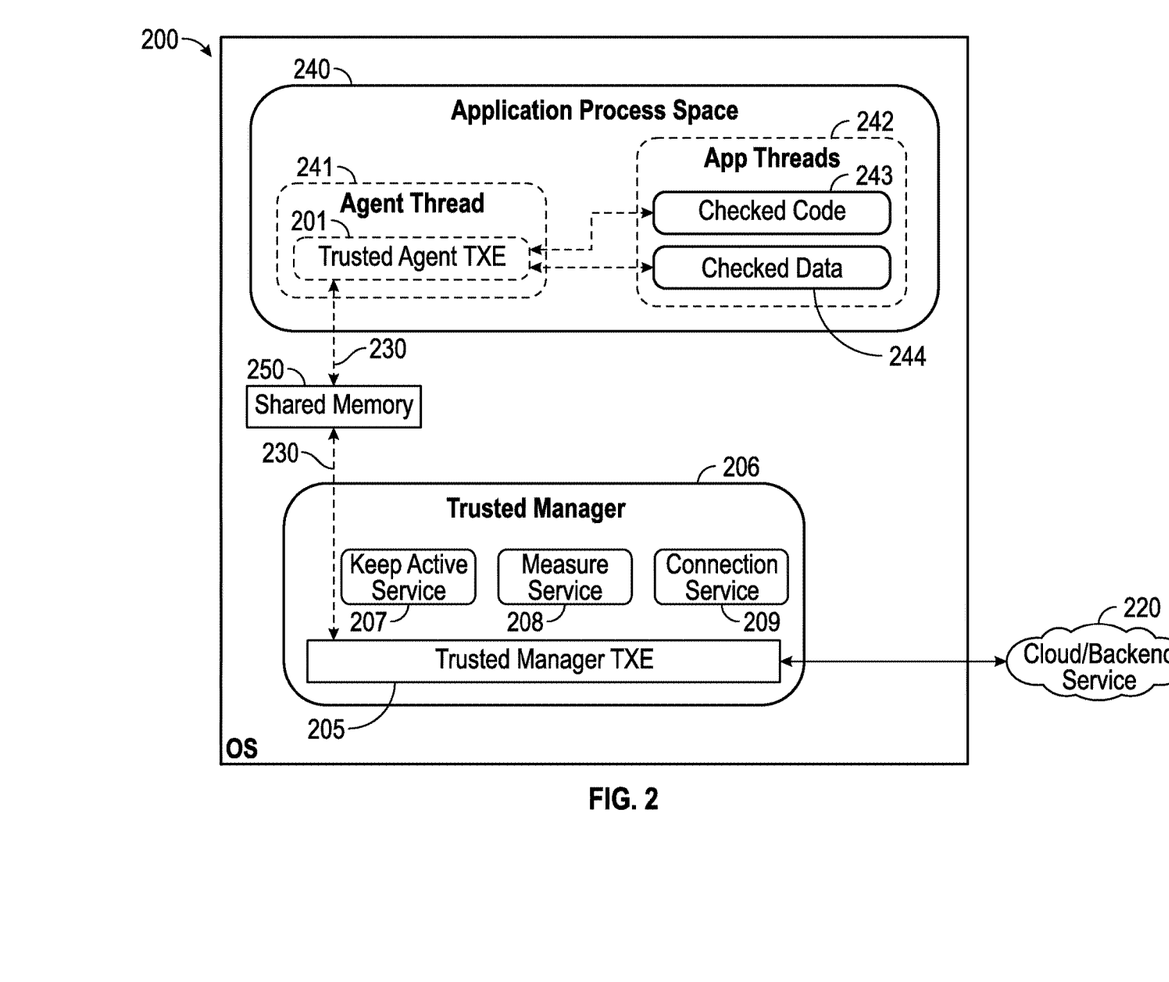
FIG. 2 includes a plurality of TXEs in an embodiment of the invention.

FIG. 2 includes a plurality of TXEs in an embodiment of the invention. Trusted agent TXE 201 corresponds to (e.g., services) agent thread 241 and application thread 242, and more specifically corresponds to portions of application thread 242 such as specific portions of code 243 and/or data 244 that are to be measured to assess integrity of the code and/or data. Agent thread 241 and application thread(s) 242 all operate within application process space 240, such as the ring 3 layer.

Agent thread 241 couples to trusted manager TXE 205 via shared memory 250. However, in an embodiment the coupling may be achieved via secure connection such as Transport Layer Security (TLS) or Secure Sockets Layer (SSL) pathways, which are cryptographic protocols designed to provide communication security over the Internet.

Trusted manager TXE 205 corresponds to (or services) trusted manager thread 206, which may offer services such as keepalive service 207, measurement service 208, and/or a coupling to connection service 209. Trusted manager TXE 205 may operate at the ring 3 layer/level.

Applications, such as applications 110, 111, 112 may statically link with (or dynamically load) trusted agent TXEs 101, 102, 103 and run those TXEs as new threads (e.g., agent thread 241) in the process. Using application 110 as an example, application 110 will both initialize (e.g., init( )) and launch (e.g., run( )) agent TXE 101. The init( ) function may be called once when trusted agent TXE 101 (201 in FIG. 2) is loaded. In this phase the trusted agent thread 241 will create a TXE (TXE 201) to secure execution flow of executable code 243 and/or security of data 244 (e.g., keys, measurement). The run( ) function may be called periodically by application 110 and may launch TXE 201 to then measure code 243 and/or data 244.

When trusted agent TXE 201 is running (whether it be from the initial initialization init( ) or from a period launch that occurs 1, 2, 3 or more launches (run( )) after init( )), TXE 201 may perform several actions.

Figure 3:
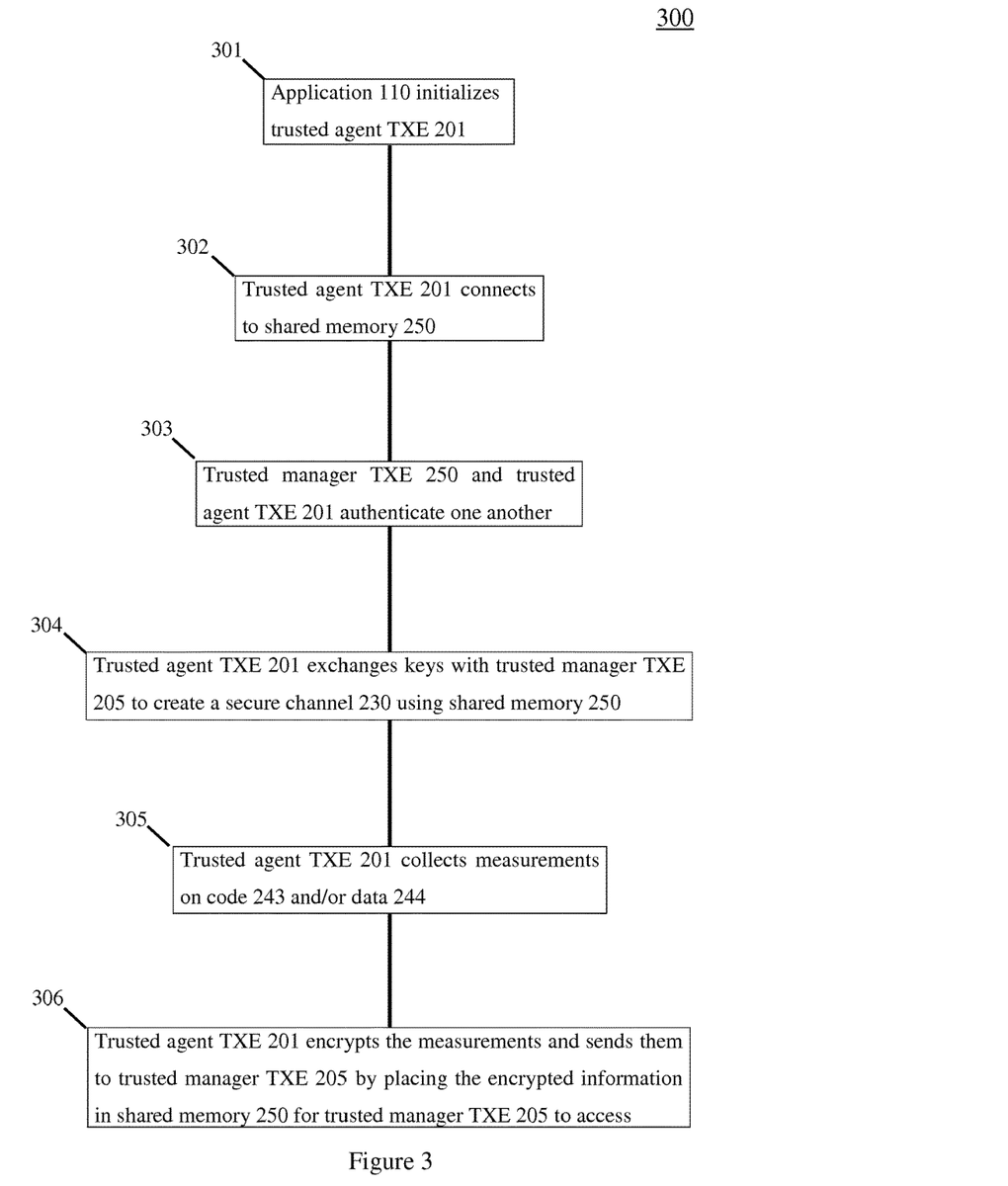
FIG. 3 includes a process in an embodiment of the invention.

FIG. 3 includes a process in an embodiment. First, when application 110 initializes trusted agent TXE 201 (element 301), trusted agent TXE 201 will connect to shared memory 250 (element 302), which was created by trusted manager 206. Trusted agent TXE 201 then exchanges keys (e.g., via a Diffie-Hellman type exchange) with trusted manager TXE 205 to create a secure channel 230 (e.g., TLS) using shared memory 250 (element 304). To secure this flow trusted manager 250 and trusted agent 201 can use TXE attestation to authenticate one another (element 303). Such an authentication is described in, for example, "Innovative Technology for CPU Based Attestation and Sealing", by Ittai Anati et al., available at https://software_intel_com/en-us/articles/innovative-technology-for-cpu-based-attestation-and-sealing).

Trusted agent TXE 201 may collect general information on the application, such as measurements of code 243 and/or data 244 (element 305). TXE 201 may then encrypt the information and send it to manager TXE 205 by placing the encrypted information in shared memory 250 for TXE 205 to access (element 306).

In an embodiment, TXE 201 may receive updated information from trusted manager TXE 205 regarding what code/data to measure. For example, backend service 220 may inform TXE 205 that code other than code 243 should be measured, so as to provide a "moving target" that malware may have a difficult time forecasting. Service 220 and/or TXE 205 may use an application identification as parameter of the init( ) call and/or with a run( ) call, with the identification having a known format and unique value. This will optimize the identification process needed to target the code and/or data to be measured.

Figure 4:
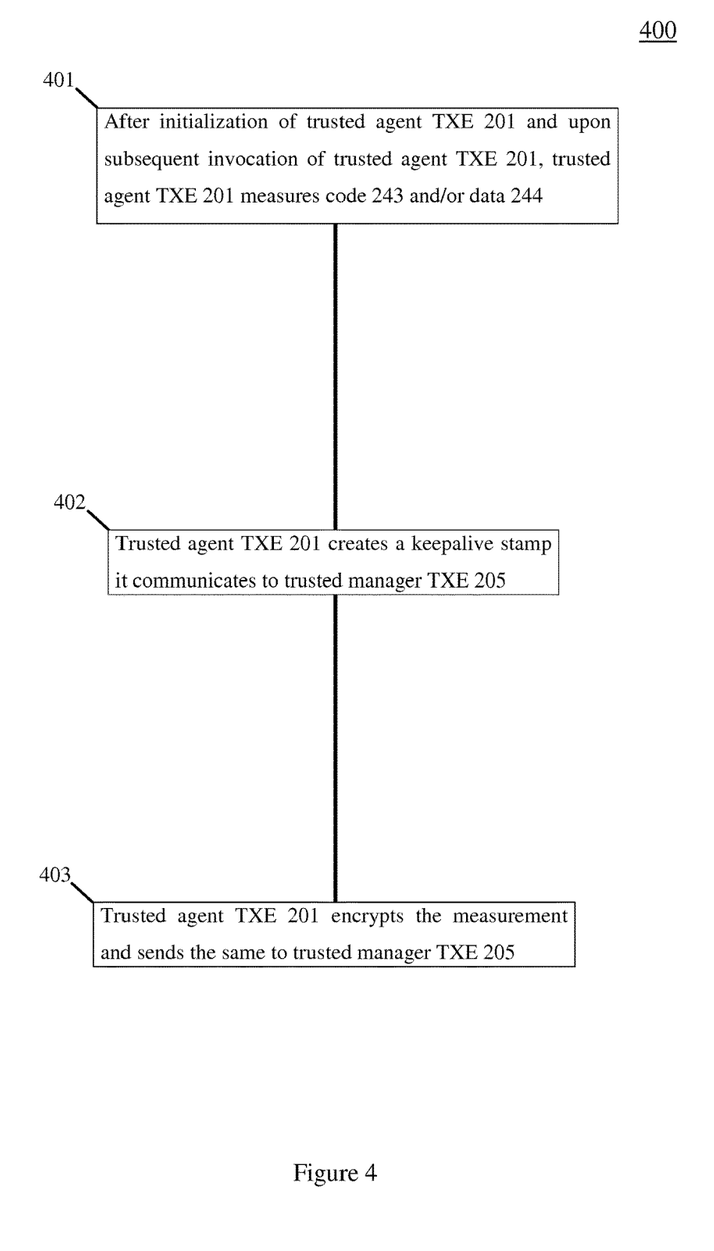
FIG. 4 includes a process in an embodiment of the invention.

FIG. 4 includes a process in an embodiment. After the initialization of TXE 201, every subsequent invocation of TXE 201 may result in TXE taking several actions. For example, TXE 201 may measure code 243 and/or data 244 and/or other code target by TXE 205 and/or service 220 (element 401). TXE 201 may further create a keepalive stamp it communicates to TXE 205 (element 402). Further, TXE 201 may encrypt the data (e.g., measurement of code 243 and/or data 244) and send the same to trusted manager TXE 205 (element 403).

In an embodiment the measurement flow/process will select fixed or random memory portions (e.g., code 243 and/or data 244) read from process memory and measure the same to create a hash. Multiple results are then analyzed via one or more of several options. For example, analysis of the measurement (e.g., comparison of one measurement to a whitelisted value) can be done by the trusted agent TXE 201. To support this option the checking algorithm and values need to be available in agent TXE 201. The agent TXE 201 can obtain expected values from trusted manager TXE 205. However, analysis can also be done by trusted manager TXE 205. In such a case the checking algorithm and values need to be available in the TXE manager 205. The manager TXE 205 can obtain expected values from the cloud service 220. In still another option, the analysis of measurements can be done by the backend service 220.

In an embodiment, a keepalive mechanism is used by all components (e.g., between TXE 201 and TXE 205 and between TXE 205 and service 220 and possibly between TXE 201 and service 220) to protect against DoS attacks. Detection of DOS attacks may be done by trusted agent TXE 201 (e.g., if TXE 201 is not called on time to perform a measurement), trusted manager TXE 205 (e.g., if agent TXE 201 did not send measurement data to TXE 205 on time), and backend service 220 (e.g., if measurement data was not sent by manager TXE 205 to server 220 on time).

An embodiment protects against a situation where malware may attempt to commandeer the supervision flow described above just before application thread 241 calls into the trusted agent TXE 201. The malware may modify the process memory space before the measurement occurs. Malware can later restore the state/content of the memory after inquiry from trusted agent 201 is over. To counter this possibility, trusted agent TXE 201 may never return control once TXE 201 is called. For example, after being initialized TXE 201 may continuously run and collect measurements by using "PAUSE" (e.g., PAUSE in Intel® instruction sets) and other similar instructions while looping inside the trusted agent TXE 201.

TXE 201 may communicate with TXE 205 via interprocess communication (IPC), which includes the activity of sharing data across multiple and commonly specialized processes using communication protocols.

Thus, embodiments described above provide a unique combination of secure execution using TXEs, secure IPCs between TXEs using encrypted data transfer via shared memory or TLS type channels, trusted keepalive mechanisms, memory measurement and verification, and use of a backend service for control, management, and reporting.

Figure 5:
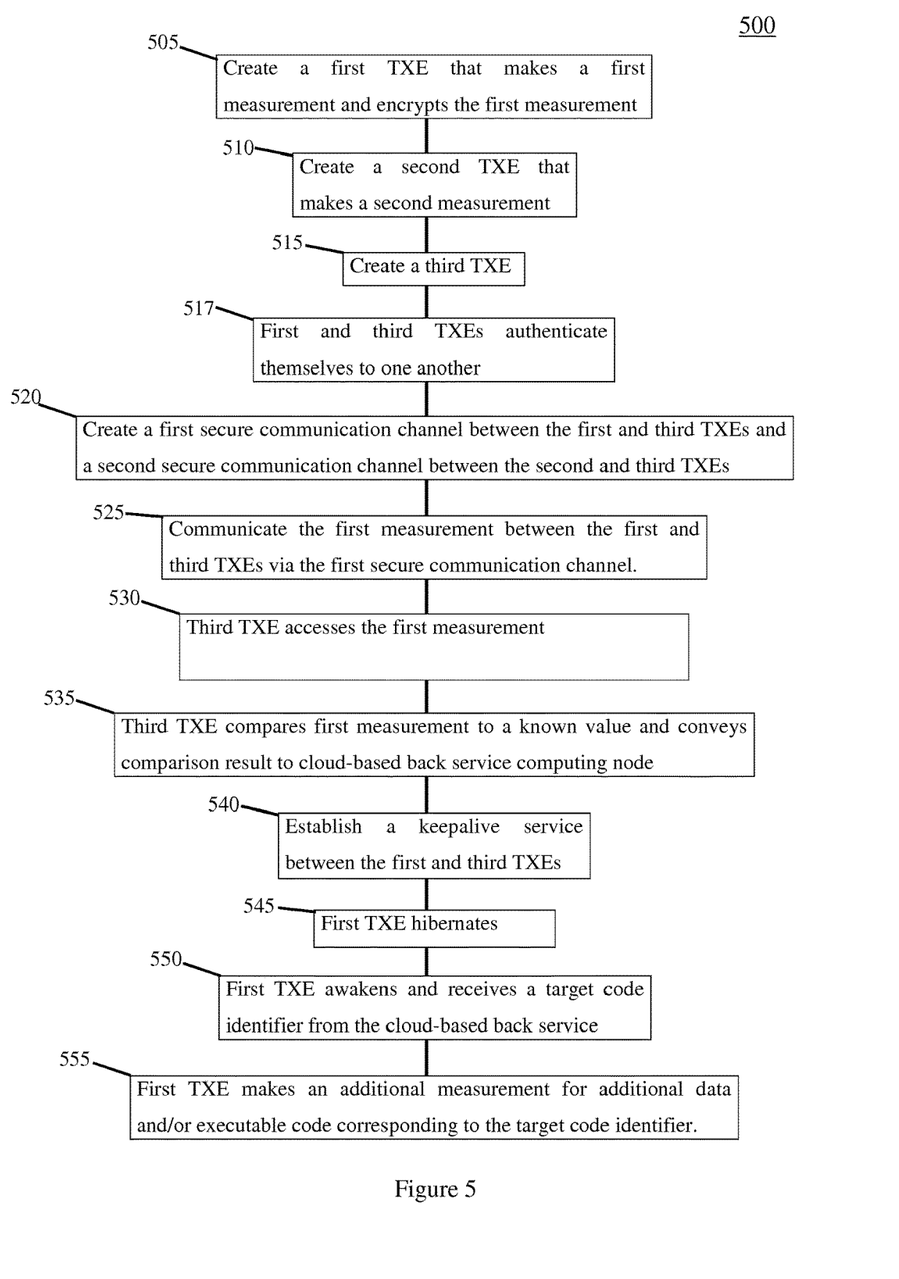
FIG. 5 includes a process in an embodiment of the invention.

FIG. 5 includes a process in an embodiment of the invention.

In an embodiment an apparatus comprises at least one memory and at least one processor, coupled to the at least one memory, to perform operations. Those operations are depicted in FIG. 5.

Block 505 includes creating a first TXE, in protected non-privileged user address space of the at least one memory (e.g., ring 3 space), which makes a first measurement for at least one of first data and first executable code (e.g., code 243, data 244) and which encrypts the first measurement with a persistent first hardware based key while the first measurement is within the first TXE. Using the hardware based key helps harden the process to make it more resilient against malware (as opposed to using software based keys). Block 505 may include linking the first TXE to code and/or data via a library including instructions that create the first TXE. Block 505 may further include the software application (e.g., application 110) initializing the first TXE. The first TXE may make the first measurement in response to a call from the third TXE for the first TXE to make the first measurement.

Block 510 includes creating a second TXE, in the non-privileged user address space (e.g., space 240), which makes a second measurement for at least one of second data and second executable code (e.g., code and date analogous to code 242, data 243 but for application 111 instead of application corresponding to code 242, data 242).

Block 515 includes creating a third TXE in the non-privileged user address space.

Block 517 includes authenticating the first TXE to the third TXE. Block 517 may also include authenticating the third TXE to a remote computing node (e.g., service 220).

Block 520 includes creating a first secure communication channel between the first and third TXEs (e.g., channel 130) and a second secure communication channel between the second and third TXEs (e.g., channel 131).

Block 525 includes communicating the first measurement between the first and third TXEs via the first secure communication channel. This may include storing the first measurement in at least one memory. The at least one memory may be shared between the first and third TXEs.

Block 530 includes the third TXE accessing the first measurement while the first measurement is stored in the at least one memory. This may also include storing the second measurement in the at least one memory.

Block 535 includes comparing the first measurement with another measurement value. Block 535 may also include authenticating the third TXE to a remote computing node (e.g., service 220) based on at least one of the persistent first hardware based key and a persistent second hardware based key. Thus, the TXEs 201, 205 may rely on one or more hardware based keys to provide authentication and sealing, as described more fully in, for example, "Innovative Technology for CPU Based Attestation and Sealing", by Ittai Anati et al., available at https://software_intel_com/en-us/articles/innovative-technology-for-cpu-based-attestation-and-sealing). Block 535 may further include establishing a keepalive service between the remote computing node and the third TXE.

Block 540 includes establishing a keepalive service between the first and third TXEs. Block 545 includes the first TXE hibernating/sleeping only to be periodically launched/awoken in block 550. Thus, a software application (e.g., application 110) may, after initializing the first TXE and then having first TXE hibernate, periodically launch the first TXE. Block 550 also includes, after the first TXE makes the first measurement, receiving a target code identifier from the remote computing node and then making an additional measurement for target code corresponding to the target code identifier (block 555).

As mentioned above many times, embodiments use TXEs, examples of which include secure enclaves. A TXE prevents software executing outside the enclave from having access to software and data inside the enclave. The TXE comprises a virtual memory region that defines the TXE, which prevents software executing outside the enclave from having access to software and data inside the enclave.

Various embodiments of TXEs/secure enclaves are described in, for example, the U.S. patent application entitled "Method and Apparatus to Provide Secure Application Execution", filed Nov. 13, 2009 (Ser. No. 12/590,767); the PCT Patent Application entitled "Method and Apparatus to Provide Secure Application Execution", filed Dec. 22, 2009 (Application No. PCT/US2009/069212); the U.S. patent application entitled "System and Method for Implementing a Trusted Dynamic Launch and Trusted Platform Module (TPM) Using Secure Enclaves", filed Dec. 22, 2010 (U.S. Pat. No. 8,832,452); the PCT Patent Application entitled "Technologies For Hardening The Security Of Digital Information On Client Platforms", filed Jun. 4, 2013 (Application No. PCT/US2013/44158); "Using Innovative Instructions to Create Trustworthy Solutions" (by Matthew Hoekstra et al.), "Innovative Instructions and Software Model for Isolated Execution" (by Frank Mckeen et al.), http://software*intel*com/sites/default/files/329298-001.pdf, and other papers presented at The Second Workshop on Hardware and Architectural Support for Security and Privacy, In Conjunction with ISCA 40, Jun. 24, 2013 in Tel-Aviv, Israel. Consequently, details regarding operation of secure enclaves are not entirely addressed herein. These applications and papers are referred to herein collectively as the "secure enclave materials."

As described in the secure enclave materials, a secure enclave is carved out of the virtual address space of its containing process. Memory management of the enclave is performed in terms of virtual addresses. In an embodiment enclave memory management is divided into two parts: address space allocation and memory commitment. Address space allocation is the specification of a maximal range of addresses that the enclave may use. No actual resources are committed to this region. Memory commitment is the assignment of actual memory resources (as pages) within the allocated address space. This two-phase technique allows enclaves to flexibly control their memory usage and allow for growth without overusing memory resources when enclave needs are low. Commitment adds virtual pages to the enclave.

This distinction is reflected in the two instructions ECREATE and EADD. ECREATE allocates a range of addresses for use by the enclave. EADD commits virtual memory pages within that range to the enclave. An operating system may support separate allocate and commit operations. For example, the Windows API VirtualAlloc takes a flag argument of MEM_RESERVE (allocation) or MEM_COMMIT (commitment). It is not required that an OS support this separation, but its presence can make memory management within an enclave more flexible and efficient.

In one embodiment, a secure enclave is created using the ECREATE instruction, specifying a base and size of the virtual address space range in which the enclave is to be built. Memory is added to the secure enclave before it is sealed. The enclave creation and commitment process is best illustrated, for example, by using the Windows API and proceeds as follows: (1) reserve address space region in the process using VirtualAlloc, passing in the MEM_RESERVE flag (which reserves a region of memory without actually committing any physical memory or page file storage); (2) commit the first page of the enclave by calling VirtualAlloc again, this time with the MEM_COMMIT flag; (3) use the ECREATE instruction to set up the initial environment, specifying the same address range as above (i.e., ECREATE allocates a region of virtual memory within the application for hosting the secure code and data); and (4) for each additional page to be added to the enclave: VirtualAlloc the enclave page, use EADD to add the new page to the enclave, use EEXTEND to add a measurement for 128 bytes of the page (EEXTEND updates the measurement of the enclave to include the code or data added in EADD), and call this instruction until the entire enclave is measured (e.g., a measurement may include a cryptographic hash of the code and data in an enclave at the time it is initialized). If a contiguous set of enclave pages is to be added at once, the above steps can be reordered and optimized to minimize the number of system calls. On operating systems that do not support separate reserve and commit operations, the VirtualAlloc above can be replaced by a simple malloc, for example, and the remaining calls to VirtualAlloc eliminated.

Because the ECREATE and EADD instructions enable encryption and integrity for the added page, it is not possible for non-enclave software to initialize this memory after it has been added to the enclave. The runtime system must completely initialize any memory for which it is responsible before EADDing it. This typically requires the runtime system to build the enclave image in-place, even before calling ECREATE (i.e., because SECS cannot be modified by software after ECREATE). Once memory has been initialized, the enclave ECREATEd and its memory EADDed, it may be sealed and measured as described herein.

In one embodiment, there are two data structures inside the enclave, the Secure Enclave Control Store (SECS) and the Thread Control Structure (TCS). SECS and TCS contain architectural information and non-architectural convenience fields used by the runtime software. Once the SECS, one or more TCSs, and the code and data have been EADDed, the enclave creation is completed by the EINIT instruction. This instruction stops further measurement information from being written into a measurement register (MR) (sometimes referred to in the co-pending applications as "IR0"). In other words, EINIT locks down the contents of the enclave and ensures that only the code within the enclave has access to the data regions in the same enclave. After EINIT no further pages may be added to the enclave.

Untrusted code calls into the enclave using the EENTER instruction and the enclave returns back to the untrusted caller via EEXIT. On enclave entry, control is transferred to code which switches the stack pointer to one inside the enclave. When returning the software again swaps the stack pointer then executes the EEXIT instruction.

Thus, once the enclave has been created and initialized with EINIT, attempted accesses to the enclave's memory from unauthorized software, even software such as virtual machine monitors, BIOS, or operating system functions operating at a higher privilege level than the enclave itself, are prevented. From a physical point of view, while enclave data is resident within registers, caches, or other logic blocks inside the processor package, unauthorized access via software is prevented by CPU logic. Whenever enclave data leaves the on-package caches to be written to platform memory, the data is automatically encrypted and its integrity is protected. This prevents malicious individuals from using memory probes or other techniques to view, modify, or replay data or code contained within the enclave.

The immediately preceding description discusses various mechanisms for instantiating secure enclaves. Disabling secure enclaves may occur in a similar manner by disabling the memory configuration necessary for establishing the secure enclave during the following boot.

The use of hardware based solutions to provide TXEs is addressed in, for example, "Innovative Technology for CPU Based Attestation and Sealing", by Ittai Anati et al., available at https://software_intel_com/en-us/articles/innovative-technology-for-cpu-based-attestation-and-sealing) and addressed further below.

As provided in this article, TXEs (also referred to as "enclaves") can cooperate with one another to perform some higher-level function. In order to do this they need to authenticate one another. For this purpose a TXE, such as Intel® SGX architecture, is discussed to explain the concept. The Intel® SGX architecture provides the EREPORT instruction.

When invoked by an enclave, EREPORT creates a signed structure (which may be based on a persistent hardware based key), known as a REPORT. The REPORT structure contains the two identities of the enclave, the attributes associated with the enclave (attributes identify modes and other properties established during ECREATE), the trustworthiness of the hardware TCB, and additional information the enclave developer wishes to pass on to the target enclave, and a message authentication code (MAC) tag.

The target enclave is the enclave which will verify the MAC over the REPORT allowing it to determine that the enclave that created the REPORT has run on the same platform. The MAC is produced with a key called the "Report Key". Report Key is known only to the target enclave and to the EREPORT instruction. The validating (target) enclave can retrieve its own Report Key using the EGETKEY instruction. EGETKEY provides enclaves with keys, among them the Report Key, usable for symmetric encryption and authentication. The target enclave uses the Report Key to recompute the MAC over the REPORT data structure, and verify that the REPORT was produced by the attesting (reporting) enclave.

Each REPORT structure also includes a 256-bit field for User Data. This field binds data that is inside the enclave to the identity of the enclave (as expressed by the REPORT). This field can be used to extend the REPORT with auxiliary data by populating it with a hash digest of the auxiliary data, which is then provided alongside the REPORT. The use of the User Data field enables an enclave to build a higher level protocol to form a secure channel between itself and another entity. For example, by exchanging REPORTs that authenticate public Diffie-Hellman keys, that were randomly generated inside the enclave using mutually agreed parameters, the enclaves can generate an authenticated shared secret and use it to protect further communications between themselves. The Intel® Architecture supports the generation of true random values through the RDRAND instruction available for use by enclave software.

An authentication process is a follows. First, after communication paths between enclave A (e.g., TXE 201) and B (e.g., TXE 205) have been established, enclave A obtains enclave B's MRENCLAVE value. Note that the communication path in this step does not have to be secure. Second, Enclave A invokes the EREPORT instruction together with enclave B's MRENCLAVE to create a signed REPORT destined for enclave B. Enclave A transmits its REPORT to enclave B via the untrusted communication path. Third, after receiving the REPORT from enclave A, Enclave B calls EGETKEY to retrieve its Report Key, recomputes the MAC over the REPORT structure, and compares the result with the MAC accompanying the REPORT. A match in the MAC value affirms that A is indeed an enclave that is running on the same platform as enclave B and as such that A is running in an environment that abides to Intel® SGX's security model. Once the firmware and hardware components of the TCB have been verified, Enclave B can then examine Enclave A's REPORT to verify the software components of the TCB: MRENCLAVE reflects the contents of the software image running inside the enclave and MRSIGNER reflects the sealer's identity. Enclave B can then reciprocate by creating a REPORT for enclave A, by using the MRENCLAVE value from the REPORT it just received. Enclave B transmits its REPORT to enclave A. Enclave A can then verify the report in a similar manner to enclave B confirming that enclave B exists on the same platform as enclave A.

Embodiments discussed herein, such as device 100, may utilize a system such as the system of FIG. 6, discussed below. In fact, embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Figure 6:
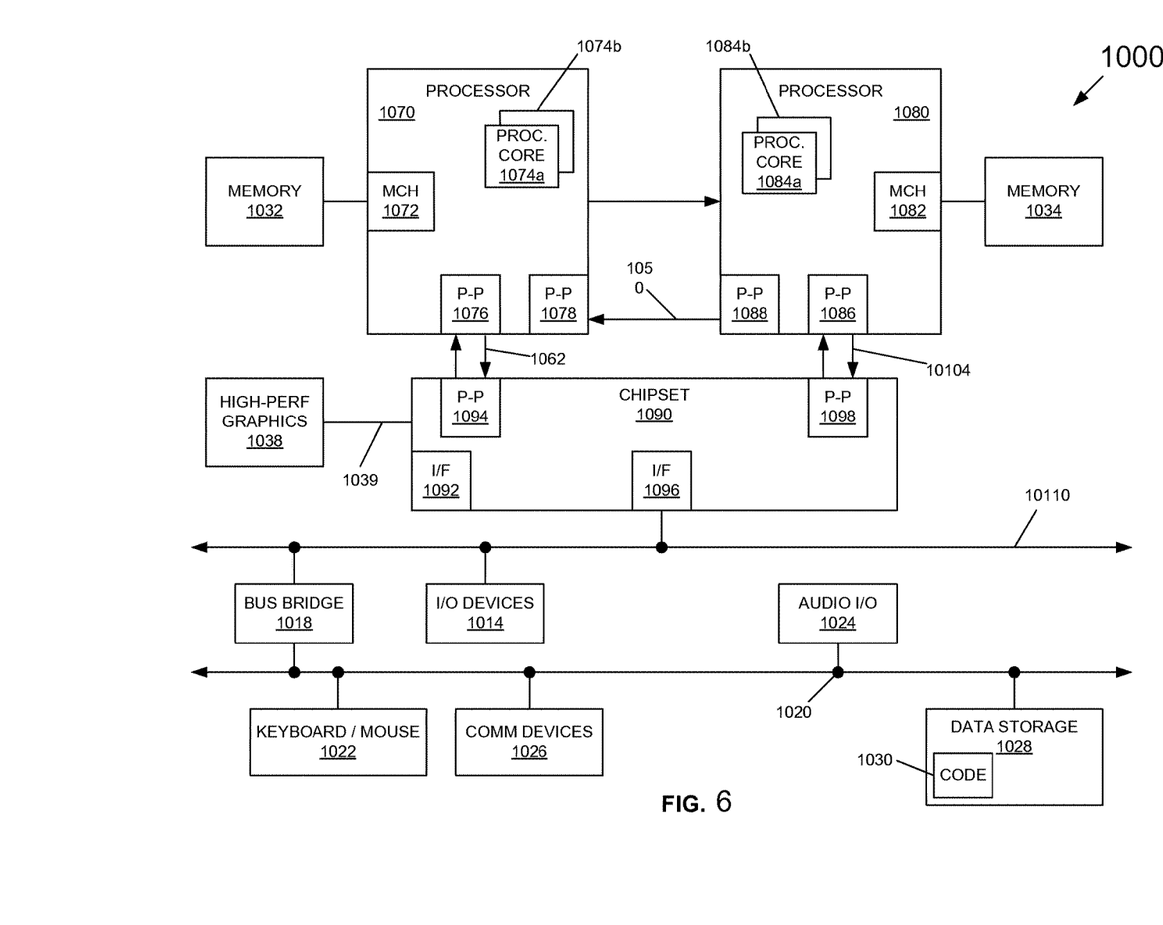
FIG. 6 includes a system for use with an embodiment of the invention.

Referring now to FIG. 6, shown is a block diagram of a system embodiment 1000 in accordance with an embodiment of the present invention. System 1000 may be included in, for example, a mobile computing node such as a cellular phone, smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074*a* and 1074*b* and processor cores 1084*a* and 1084*b*). Such cores 1074, 1074*b*, 1084*a*, 1084*b* may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discreet logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture shown, a system may implement a multi-drop bus or another such communication topology. Also, the elements of FIG. 6 may alternatively be partitioned using more or fewer integrated chips than shown in the FIG. 6.

Example 1a includes an apparatus comprising: at least one memory and at least one processor, coupled to the at least one memory, to perform operations comprising: creating a first trusted execution environment (TXE), in protected non-privileged user address space of the at least one memory, which makes a first measurement for at least one of first data and first executable code and which encrypts the first measurement with a persistent first hardware based key while the first measurement is within the first TXE; creating a second TXE, in the non-privileged user address space, which makes a second measurement for at least one of second data and second executable code; creating a third TXE in the non-privileged user address space; creating a first secure communication channel between the first and third TXEs and a second secure communication channel between the second and third TXEs; and communicating the first measurement between the first and third TXEs via the first secure communication channel.

The "first TXE" may not necessarily be the first such TXE created on a device. The creation of a user enclave (e.g., trusted agent 101) may require that other architectural type enclaves already be present at the time the user enclave is formed.

In example 2a the subject matter of Example 1a can optionally include wherein the at least one processor is to perform operations comprising linking the first TXE to the at least one of the first executable code and the first data via a library including instructions that in response to being executed cause the at least one processor to create the first TXE.

In example 3a the subject matter of Examples 1a-2a can optionally include wherein the at least one processor is to perform operations comprising establishing a keep alive service between the first and third TXEs.

In example 4a the subject matter of Examples 1a-3a can optionally include. wherein the at least one processor is to perform operations comprising the first TXE, in the non-privileged user address space, making an additional measurement for at least one of additional data and additional executable code.

In example 5a the subject matter of Examples 1a-4a can optionally include wherein the first executable code and the additional executable code both correspond to at least a portion of a first software application.

In example 6a the subject matter of Examples 1a-5a can optionally include wherein the at least one processor is to perform operations comprising the first software application initializing the first TXE.

In example 7a the subject matter of Examples 1a-6a can optionally include wherein the at least one processor is to perform operations comprising the first software application, after initializing the first TXE, periodically launching the first TXE.

In example 8a the subject matter of Examples 1a-7a can optionally include wherein the at least one processor is to perform operations comprising making measurements for at least one of the first data and the first executable code and communicating the measurements, which are encrypted based on the first hardware based key while the measurements are still within the first TXE, between the first and third TXEs via the first secure communication channel.

In example 9a the subject matter of Examples 1a-8a can optionally include wherein the at least one processor is to perform operations comprising storing the first measurement in the at least one memory; wherein the first TXE comprises a virtual memory region that defines the first TXE and prevents software executing outside the first TXE from having access to software and data inside the first TXE.

In an embodiment, both virtual memory (i.e., enclave addresses within the same user process) and physical memory (i.e., enclave pages in system RAM) are protected.

In example 10a the subject matter of Examples 1a-9a can optionally include wherein the at least one processor is to perform operations comprising the third TXE accessing the first measurement while the first measurement is stored in the at least one memory.

In example 11a the subject matter of Examples 1a-10a can optionally include wherein the at least one memory is shared between the first and third TXEs.

In example 12a the subject matter of Examples 1a-11a can optionally include wherein the at least one processor is to perform operations comprising storing the second measurement in the at least one memory.

In example 13a the subject matter of Examples 1a-12a can optionally include wherein the at least one processor is to perform operations comprising comparing the first measurement with another measurement value.

In example 14a the subject matter of Examples 1a-13a can optionally include wherein the at least one processor is to perform operations comprising authenticating the third TXE to a remote computing node.

The third remote computing node, such as node 120, may be formed within a TXE in an embodiment but not in other embodiments.

In example 15a the subject matter of Examples 1a-14a can optionally include wherein, after the first TXE makes the first measurement, the at least one processor is to perform operations comprising receiving a target code identifier from the remote computing node and then making an additional measurement for target code corresponding to the target code identifier.

In example 16a the subject matter of Examples 1a-15a can optionally include, wherein the at least one processor is to perform operations comprising establishing a keep alive service between the remote computing node and the third TXE.

In example 17a the subject matter of Examples 1a-16a can optionally include, wherein the at least one processor is to perform operations comprising the second TXE encrypting the second measurement based on the persistent first hardware based key and communicating the second measurement between the second and third TXEs via the second secure communication channel.

In an embodiment the first and second TXEs each encrypt materials "based on" the first hardware based key but may in fact rely on key derivation that involves enclave-specific data. As a result, in an embodiment the actual keys used to encrypt the first and second measurements may be different while being based on the same key (e.g., derived from or build from the same key).

In example 18a the subject matter of Examples 1a-17a can optionally include, wherein the at least one processor is to perform operations comprising authenticating the first TXE to the third TXE before communicating the first measurement between the first and third TXEs via the first secure communication channel.

In example 19a the subject matter of Examples 1a-18a can optionally include wherein the at least one processor is to perform operations comprising the first TXE making the first measurement in response to a call from the third TXE for the first TXE to make the first measurement.

In example 20a the subject matter of Examples 1a-19a can optionally include wherein the at least one processor is to perform operations comprising authenticating the third TXE to a remote computing node based on at least one of the persistent first hardware based key and a persistent second hardware based key.

In example 21a the subject matter of Examples 1a-20a can optionally include wherein the protected non-privileged user address space of the at least one memory corresponds to a ring 3 privilege level and not to a ring 0 privilege level, and further wherein while the first measurement is within the first TXE the first measurement is in accessible to instructions not executing within the first TXE.

Example 22a includes an apparatus comprising: at least one processor, coupled to at least one memory, to perform operations comprising: the at least one processor creating first and second trusted execution environments (TXEs) in non-privileged user address space of the at least one memory; the first TXE making a measurement of executable code and encrypting the measurement with a hardware based key while the measurement is within the first TXE; and the first TXE communicating the measurement between the first and second TXEs via a secure communication channel; wherein the first TXE comprises a virtual memory region that defines the first TXE and prevents software executing outside the first TXE from having access to software and data inside the first TXE.

In example 23a the subject matter of Example 22a can optionally include wherein the at least one processor is to perform operations comprising a software application, upon which the measurement is made, initializing the first TXE and, after initializing the first TXE, periodically launching the first TXE.

In example 24a the subject matter of Examples 22a-23a can optionally include wherein the at least one processor is to perform operations comprising authenticating the second TXE to a remote computing node based on at least one of the hardware based key and another hardware based key.

Example 25a includes at least one storage medium having instructions stored thereon for causing a system to: create first and second trusted execution environments (TXEs) in non-privileged user address space of at least one memory; making a measurement of executable code and encrypting the measurement with a hardware based key while the measurement is within the first TXE; and communicating the measurement between the first and second TXEs via a secure communication channel.

In example 26a the subject matter of Example 25a can optionally include instructions such that a software application, upon which the measurement is made, initializes the first TXE and, after initializing the first TXE, periodically launches the first TXE.

Example 1b includes a method executed by at least one processor comprising: creating a first trusted execution environment (TXE), in protected non-privileged user address space of at least one memory, which makes a first measurement for at least one of first data and first executable code and which encrypts the first measurement with a persistent first hardware based key while the first measurement is within the first TXE; creating a second TXE, in the non-privileged user address space, which makes a second measurement for at least one of second data and second executable code; creating a third TXE in the non-privileged user address space; creating a first secure communication channel between the first and third TXEs and a second secure communication channel between the second and third TXEs; and communicating the first measurement between the first and third TXEs via the first secure communication channel.

In example 2b the subject matter of Example 1a can optionally include linking the first TXE to the at least one of the first executable code and the first data via a library including instructions that in response to being executed cause the at least one processor to create the first TXE.

In example 3b the subject matter of Examples 1a-2a can optionally include establishing a keep alive service between the first and third TXEs.

In example 4b the subject matter of Examples 1a-3a can optionally include the first TXE, in the non-privileged user address space, making an additional measurement for at least one of additional data and additional executable code.

In example 5b the subject matter of Examples 1a-4a can optionally include wherein the first executable code and the additional executable code both correspond to at least a portion of a first software application.

In example 6b the subject matter of Examples 1a-5a can optionally include the first software application initializing the first TXE.

In example 7b the subject matter of Examples 1a-6a can optionally include the first software application, after initializing the first TXE, periodically launching the first TXE.

In example 8b the subject matter of Examples 1a-7a can optionally include making measurements for at least one of the first data and the first executable code and communicating the measurements, which are encrypted based on the first hardware based key while the measurements are still within the first TXE, between the first and third TXEs via the first secure communication channel.

In example 9b the subject matter of Examples 1a-8a can optionally include storing the first measurement in the at least one memory; wherein the first TXE comprises a virtual memory region that defines the first TXE and prevents software executing outside the first TXE from having access to software and data inside the first TXE.

In example 10b the subject matter of Examples 1a-9a can optionally include the third TXE accessing the first measurement while the first measurement is stored in the at least one memory.

In example 11b the subject matter of Examples 1a-10a can optionally include wherein the at least one memory is shared between the first and third TXEs.

In example 12b the subject matter of Examples 1a-11a can optionally include storing the second measurement in the at least one memory.

In example 13b the subject matter of Examples 1a-12a can optionally include comparing the first measurement with another measurement value.

In example 14b the subject matter of Examples 1a-13a can optionally include authenticating the third TXE to a remote computing node.

In example 15b the subject matter of Examples 1a-14a can optionally include, after the first TXE makes the first measurement, receiving a target code identifier from the remote computing node and then making an additional measurement for target code corresponding to the target code identifier.

In example 16b the subject matter of Examples 1a-15a can optionally include establishing a keep alive service between the remote computing node and the third TXE.

In example 17b the subject matter of Examples 1a-16a can optionally include the second TXE encrypting the second measurement based on the persistent first hardware based key and communicating the second measurement between the second and third TXEs via the second secure communication channel.

In example 18b the subject matter of Examples 1a-17a can optionally include authenticating the first TXE to the third TXE before communicating the first measurement between the first and third TXEs via the first secure communication channel.

In example 19b the subject matter of Examples 1a-18a can optionally include the first TXE making the first measurement in response to a call from the third TXE for the first TXE to make the first measurement.

In example 20b the subject matter of Examples 1a-19a can optionally include authenticating the third TXE to a remote computing node based on at least one of the persistent first hardware based key and a persistent second hardware based key.

In example 21b the subject matter of Examples 1a-20a can optionally include wherein the protected non-privileged user address space of the at least one memory corresponds to a ring 3 privilege level and not to a ring 0 privilege level, and further wherein while the first measurement is within the first TXE the first measurement is not accessible to instructions not executing within the first TXE.

Example 22b includes method executed by at least one processor comprising: creating first and second trusted execution environments (TXEs) in non-privileged user address space of the at least one memory; the first TXE making a measurement of executable code and encrypting the measurement with a hardware based key while the measurement is within the first TXE; and the first TXE communicating the measurement between the first and second TXEs via a secure communication channel; wherein the first TXE comprises a virtual memory region that defines the first TXE and prevents software executing outside the first TXE from having access to software and data inside the first TXE.

In example 23b the subject matter of Example 22b can optionally include (a) a software application, upon which the measurement is made, initializing the first TXE and, after initializing the first TXE, periodically launching the first TXE; and (b) authenticating the second TXE to a remote computing node based on at least one of the hardware based key and another hardware based key.

In example 24b the subject matter of Examples 1b-23b can optionally include at least one machine readable medium comprising a plurality of instructions that in response to being executed on a computing device, cause the computing device to carry out a method according to any one of examples 1b to 23b.

In example 25b the subject matter of Examples 1b-23b can optionally include a communications device arranged to carry out a method according to any one of examples 1b-23b.

In example 25b the subject matter of Examples 1b-23b can optionally include an apparatus comprising means for performing any one of examples 1b to 23b.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   at least one memory comprising instructions; and
   at least one processor to execute the instructions to:
   create a first trusted execution environment (TXE) in protected non-privileged user address space of the at least one memory, the first TXE to make a first measurement of first executable code included in a first software application, the first TXE further to, while the first measurement is within the first TXE, encrypt the first measurement with a persistent first hardware based key, the first TXE to measure executable code only of the first software application;
   create a second TXE in the non-privileged user address space, the second TXE to measure executable code only of a second software application;
   create a third TXE in the non-privileged user address space;
   create a first secure communication channel between the first and third TXEs; and
   communicate the first measurement encrypted by the first TXE from the first TXE to the third TXE via the first secure communication channel.

2. The apparatus of claim 1, wherein the at least one processor is to link the first TXE to the at least one of the first executable code and the first data via a library, the library including instructions that in response to being executed cause the at least one processor to create the first TXE.

3. The apparatus of claim 1, wherein the at least one processor is to establish a keep alive service between the first and third TXEs.

4. The apparatus of claim 1, wherein the first TXE in the non-privileged user address space is to make an additional measurement for at least one of additional data and additional executable code, wherein the additional executable code is included in the first software application, wherein the first software application is to initialize the first TXE, wherein the first software application, after initializing the first TXE, is to periodically launch the first TXE.

5. The apparatus of claim 1, wherein the at least one processor is to store the first measurement in the at least one memory, wherein the first TXE comprises a virtual memory region that defines the first TXE, wherein the virtual memory region prevents software executing outside the first TXE from having access to software and data inside the first TXE, wherein the third TXE is to access the first measurement while the first measurement is stored in the at least one memory.

6. The apparatus of claim 5, wherein the at least one memory is shared between the first and third TXEs.

7. The apparatus of claim 1, wherein the second software application is to initialize the second TXE.

8. The apparatus of claim 1, wherein the first TXE is executed as a thread of the first software application.

9. The apparatus of claim 1, wherein the at least one processor is to authenticate the third TXE to a remote computing node.

10. The apparatus of claim 9, wherein, after the first TXE makes the first measurement, the at least one processor is to receive a target code identifier from the remote computing node, and make an additional measurement for target code corresponding to the target code identifier.

11. The apparatus of claim 9, wherein the at least one processor is to establish a keep alive service between the remote computing node and the third TXE.

12. The apparatus of claim 1, wherein the second TXE is to make a second measurement of second executable code included in the second software application, the second TXE is to encrypt the second measurement based on the persistent first hardware based key, and the second TXE is to communicate the second measurement between the second and third TXEs via a second secure communication channel.

13. The apparatus of claim 1, wherein the at least one processor is to authenticate the first TXE to the third TXE before a communication of the first measurement encrypted by the first TXE from the first TXE to the third TXE via the first secure communication channel.

14. The apparatus of claim 1, wherein the first TXE is to make the first measurement in response to a call from the third TXE for the first TXE to make the first measurement.

15. The apparatus of claim 1, wherein the at least one processor is to authenticate the third TXE to a remote computing node based on at least one of the persistent first hardware based key and a persistent second hardware based key.

16. The apparatus of claim 1, wherein the protected non-privileged user address space of the at least one memory corresponds to a ring 3 privilege level and not to a ring 0 privilege level, and further wherein while the first measurement is within the first TXE the first measurement is not accessible to instructions not executing within the first TXE.

17. A method comprising:
creating, by at least one processor, first and second trusted execution environments (TXEs) in a non-privileged user address space of at least one memory, the first TXE to measure executable code only of a first software application, the second TXE to measure executable code only of a second software application;
the first TXE making a measurement of executable code included in the first software application, and encrypting the measurement with a hardware based key while the measurement is within the first TXE; and
the first TXE communicating the measurement encrypted by the first TXE from the first TXE to the second TXE via a secure communication channel;
wherein the first TXE comprises a virtual memory region that defines the first TXE and prevents software executing outside the first TXE from having access to software and data inside the first TXE.

18. The method of claim 17, further comprising:
the first software application, upon which the measurement is made, initializing the first TXE and, after initializing the first TXE, periodically launching the first TXE; and
authenticating the second TXE to a remote computing node based on at least one of the hardware based key and another hardware based key.

19. At least one non-transitory storage medium having instructions stored thereon for causing a processor to:
create first and second trusted execution environments (TXEs) in non-privileged user address space of at least one memory, the first TXE to measure executable code only of a first software application, the second TXE to measure executable code only of a second software application;
make a measurement of executable code of the first software application in the first TXE;
encrypt the measurement with a hardware based key while the measurement is within the first TXE; and
communicate the measurement encrypted in the first TXE from the first TXE to the second TXE via a secure communication channel.

20. The at least one non-transitory storage medium of claim 19 comprising instructions to:
initialize the first TXE by the first software application; and
after an initialization of the first TXE, periodically launch the first TXE by the first software application.

* * * * *